United States Patent [19]

de Zarauz

[11] 4,129,705

[45] Dec. 12, 1978

[54] POLYMERIZATION PROCESS

[75] Inventor: Yves de Zarauz, Le Cendre, France

[73] Assignee: Compagnie Generale des Etablissements Michelin, Clermont-Ferrand, France

[21] Appl. No.: 758,941

[22] Filed: Jan. 13, 1977

[30] Foreign Application Priority Data

Feb. 2, 1975 [FR] France ................. 75 04115

[51] Int. Cl.$^2$ .............................. C08F 4/52
[52] U.S. Cl. .................... 526/175; 526/174; 526/176; 526/177; 526/178; 526/180; 526/181
[58] Field of Search ................. 526/175, 174

[56] References Cited

U.S. PATENT DOCUMENTS

| 3,607,851 | 9/1971 | Forman | 526/175 |
| 3,716,495 | 2/1973 | Asich | 526/175 |

FOREIGN PATENT DOCUMENTS 4611513 4/1968 Japan ........................ 526/175

Primary Examiner—William F. Hamrock
Attorney, Agent, or Firm—Brumbaugh, Graves, Donohue & Raymond

[57] ABSTRACT

Homopolymers of conjugated dienes and copolymers of conjugated dienes with vinyl aromatic compounds or with other conjugated dienes having improved properties and an elastomeric character are prepared by use of a catalytic composition which comprises (a) an organolithium initiator and (b) a tercatalyst system comprising ($b_1$) a compound of barium or strontium or calcium, ($b_2$) an organometallic compound of a metal of Group 2B or 3A of the Mendeleev periodic table of elements and ($b_3$) an alkali metal alcoholate ether or amine.

8 Claims, 1 Drawing Figure

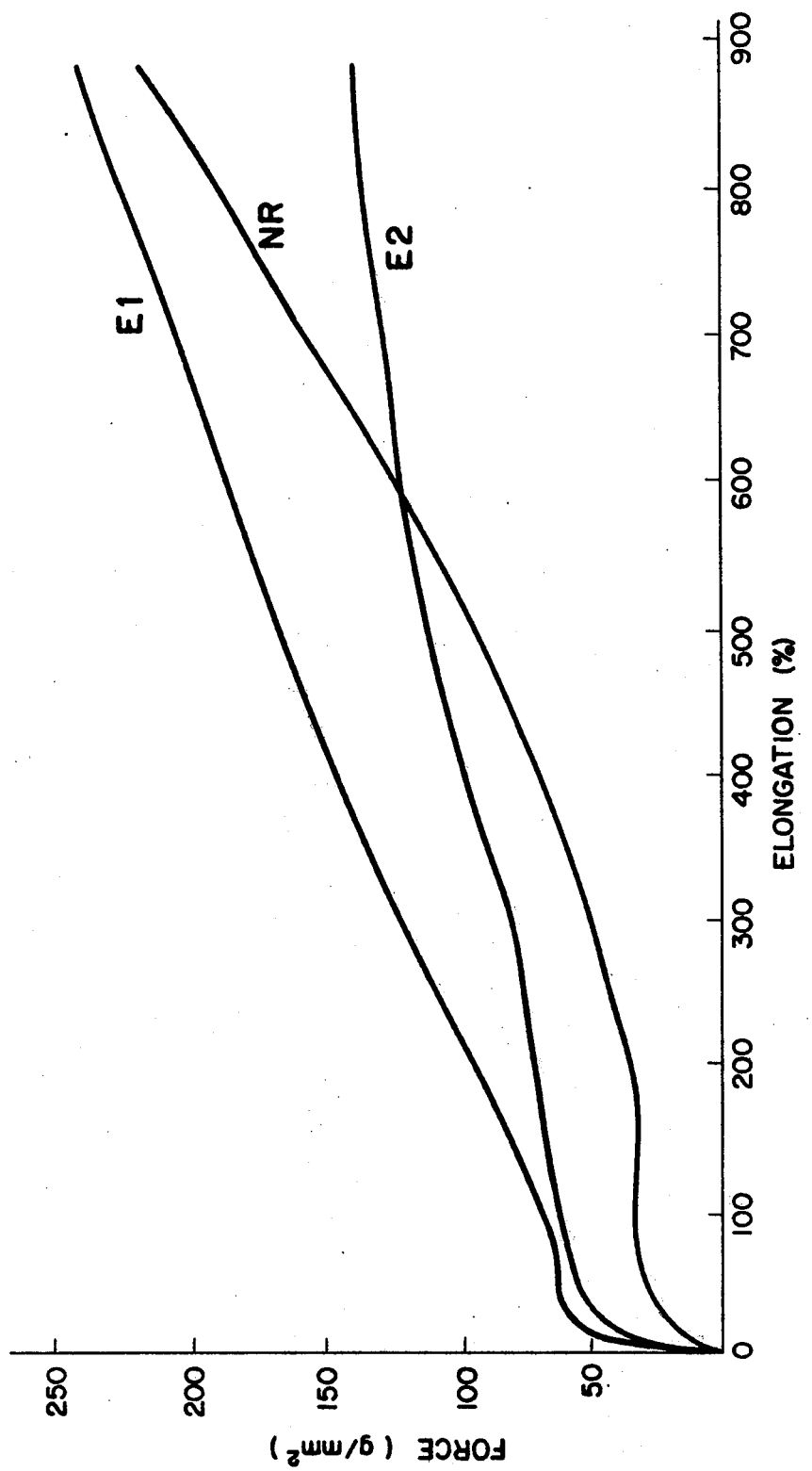

POLYMERIZATION PROCESS

The present invention relates to an improved process for the preparation of homopolymers of conjugated dienes or copolymers of conjugated dienes either with each other or with vinyl aromatic compounds, which polymers have a low content of 1,2 linkages and a high content of trans-1,4 linkages, and which polymers have an elastomeric character.

In my U.S. applications Ser. Nos. 582,120, (now abandoned), 660,695 (now U.S. Pat. No. 4,092,218) and 668,238 (now U.S. Pat. No. 4,080,492), filed May 30, 1975, Feb. 23, 1976 and Mar. 18, 1976, respectively, the entire disclosures in each of which applications are hereby incorporated by reference herein, a basic process is described of homopolymerizing conjugated dienes or copolymerizing conjugated dienes either with other conjugated dienes or with vinyl aromatic compounds, for the preparation of homopolymers or copolymers which have simultaneously a high content of more than about 70% of trans-1,4 linkages and a low content of less than about 5% of 1,2 linkages, which comprises reacting the monomers in a reaction medium in the presence of an added anionic catalytic composition comprising (a) an organo-lithium initiator and (b) a cocatalyst system comprising ($b_1$) a compound of barium or strontium and ($b_2$) an organometallic compound of a metal of Group 2B or 3A of the Mendeleev periodic table of elements.

In my U.S. application Ser. No. 697,273, filed June 17, 1976, (now U.S. Pat. No. 4,079,176) the entire disclosure in which application is also hereby incorporated by reference herein, it is disclosed that the above described basic process can be improved by replacing the two components of the cocatalyst system with a single catalyst compound having, in each molecule, one atom of a metal of Group 2A per either one atom of a metal of Group 2B or two atoms of a metal of Group 3A, and having one of the following two formulas:

$$M^{2A}[M^{3A}R^1R^2R^3R^4]_2 \text{ or } M^{2A}[M^{2B}(R^1)_4]$$

in which $M^{2A}$ is a metal of Group 2A of the Mendeleev periodic table of elements, such as barium, calcium, strontium, or magnesium; $M^{3A}$ is a metal of Group 3A of the Mendeleev periodic table of elements, such as boron, aluminum, etc.; $M^{2B}$ is a metal of Group 2B of the Mendeleev periodic table of elements, such as zinc and cadmium; $R^1$, $R^2$ and $R^3$ are alkyl or aralkyl radicals; and $R^4$ is an alkyl radical or an aralkyl radical or the radical $OR^5$ in which $R^5$ is an alkyl radical or an aralkyl radical.

It has now been found that an improvement in the foregoing basic process consists in effecting the polymerization or copolymerization in the presence of a catalytic composition comprising (a) or organo-lithium initiator and (b) a tercatalyst system comprising ($b_1$) a compound of barium or strontium or calcium, ($b_2$) an organometallic compound of a metal of Group 2B or 3A of the Mendeleev periodic table of elements and ($b_3$) an alkali metal alcoholate ether or amine and more particularly an alkali metal alcoholate ether or amine having one of the following two formulas:

$$R(OCH_2CH_2)_nOM^{1A} \text{ or } (R)_2NCH_2CH_2OM^{1A}$$

in which $M^{1A}$ represents an alkali metal, such as lithium, sodium, or potassium; R is an alkyl radical; and n is a whole number.

The present improvement makes it possible to increase substantially the content of trans-1,4 linkages of homopolymers of conjugated dienes and copolymers of conjugated dienes either with other conjugated dienes or with vinyl aromatic compounds, that is to say to obtain a content of trans-1,4 linkages of the order of 80% to 90% in the case of polybutadiene or butadiene-styrene copolymers.

The homopolymers and copolymers thus obtained have an elastomeric character which permits their use as the principal component of mixtures intended for the manufacture of pneumatic tires. Furthermore, the butadiene-styrene copolymers, containing the usual fillers for the manufacture of tires, have a "green strength" or resistance to elongation which is similar to that of natural rubber.

Furthermore, the present improvement provides particularly simple and broad possibilities of regulating the inherent viscosity of the homopolymers and copolymers. Thus it makes it possible to obtain homopolymers and copolymers having an inherent viscosity which is higher than that of the elastomers obtained by the above-mentioned basic process.

Finally, the present improved process makes it possible to obtain a rate of homopolymerization and of copolymerization which is higher than that obtained using the catalytic composition of the above-mentioned basic process.

One preferred embodiment of the present improved process consists in using the compound of barium or strontium or calcium with the organometallic compound of a metal of Group 2B or 3A of the Mendeleev periodic table of elements in the form of a preformed mixture obtained by the mixing of the two components together at a temperature between about 20° C. and about 100° C. The preformed mixture, the organo-lithium initiator, and the alkali metal alcoholate ether or amine may be added to the monomers either separately and in any order or at the same time.

The homopolymerization or copolymerization may be carried out continuously or batchwise either in solution in an aliphatic, cycloaliphatic or aromatic hydrocarbon solvent or in bulk at a temperature between about 20° C. and about 100° C.

One advantageous embodiment consists in using the components of the catalytic composition in such quantities that the ratios are within the following limits:

$$1 \leq \frac{\text{mole of an organometallic compound of a metal of Group 2B or 3A}}{\text{mole of a compound of Ba or Sr or Ca}} \leq 5$$

$$0.25 \leq \frac{\text{mole of a compound of Ba or Sr or Ca}}{\text{gram atom of lithium}} \leq 1$$

$$1 \leq \frac{\text{mole of alkali metal alcoholate ether or amine}}{\text{mole of a compound of Ba or Sr or Ca}} \leq 4$$

As alkali metal alcoholate ethers or amines, the lithium alcoholate ethers or amines are preferably used and more particularly the compounds $C_2H_5(OCH_2CH_2)_2OLi$ and $(C_2H_5)_2NCH_2CH_2OLi$.

As organometallic compounds of a metal of Group 2B or 3A, the compounds $(C_2H_5)_2Zn$, $(C_2H_5)_3Al$, and $(i\text{-butyl})_3Al$ are preferably employed.

As compounds of barium or strontium or calcium, the alcoholates or phenates are preferred and particularly barium nonylphenate.

As the organo-lithium initiator, n-butyl lithium is preferred.

Several examples of the manner in which the present improved process is carried out are given below by way of illustration.

In all tests, the inherent viscosities are established at 25° C. in a 1 g/l solution in toluene and the concentrations of the components contained in the catalytic composition are expressed in micromols per 100 g. of monomers.

The contents of trans-1,4 linkages and 1,2 linkages are expressed with respect to the diene portion, while the content by weight of styrene in the copolymer is expressed with respect to the total amount of copolymer obtained.

EXAMPLE 1

This example presents by way of comparison a test based on the homopolymerization of butadiene by means of the catalytic composition used in the above-mentioned basic process and that used in the present improved process.

The following agents were used:
solution of $C_2H_5(OCH_2CH_2)_2OLi$ in toluene
solution of butyl lithium in hexane: (BuLi)
Solution A formed of the mixture heated at 80° C. for 1 hour of 1 equivalent of barium nonylphenate with 4 equivalents of triethyl aluminum.

Two comparative tests were carried out.

Into a reactor, under the pressure of rectified nitrogen, there were introduced two liters of heptane, as solvent, and 272 g. of butadiene and the temperature was increased to 80° C. Solution A, butyl lithium and $C_2H_5(OCH_2CH_2)_2OLi$ were then added in succession.

When the conversion rate reached 70%, the reactions were stopped and the homopolymers recovered.

The results are set forth in Table I below.

TABLE I

| | Catalytic Composition | | | | | Polybutadienes | | |
|---|---|---|---|---|---|---|---|---|
| | Solution A | | | | Reaction | Inherent viscos- | Trans-1,4- con- | 1,2- con- |
| Test | Ba(OR)$_2$ | Al Et$_3$ | BuLi | C$_2$H$_5$(OCH$_2$CH$_2$)$_2$OLi | time | ity | tent (%) | tent (%) |
| 1 | 300 | 1200 | 900 | — | 6 hrs. | 2.0 | 78 | 5 |
| 2 | 300 | 1200 | 900 | 600 | 1 hr. | 2.4 | 90 | 2 |

It will be noted that the improved process of the present invention employing the Catalytic Composition 2 makes it possible to obtain, on the one hand, an appreciable increase (12%) in the content of trans-1,4 linkages and, on the other hand, homopolymers of higher inherent viscosity in shorter periods of time.

EXAMPLE 2

This example relates to the preparation of copolymers of butadiene and styrene.

Two tests were carried out in a reactor under the pressure of rectified nitrogen. Two liters of heptane, styrene and butadiene were introduced in such quantities that the ratio by weight of monomers to heptane was 1:5. The temperature was increased to 80° C. whereupon there was added the catalytic composition formed of the Solution A defined in Example 1, butyl lithium and $C_2H_5(OCH_2CH_2)_2OLi$.

When the conversion rate reached 80%, the reactions were stopped and the copolymers recovered.

The results are set forth in Table II below.

TABLE II

| | Catalytic Composition | | | | | | Copolymers | | |
|---|---|---|---|---|---|---|---|---|---|
| | Solution A | | | | Reaction | Initial Styrene | Inherent viscos- | Trans-1,4 con- | 1,2- con-tent | Content incorporated sty- |
| Test | Ba(OR)$_2$ | Al Et$_3$ | BuLi | C$_2$H$_5$(OCH$_2$CH$_2$)$_2$OLi | Time | (%) | ity | tent (%) | (%) | rene (%) |
| E1 | 440 | 1760 | 1320 | 1100 | 2 hrs. | 18 | 2.1 | 87 | 3 | 10 |
| E2 | 440 | 1760 | 1320 | 1100 | 2 hrs. 10 min. | 25 | 1.98 | 87 | 3 | 14 |

On test pieces of these two copolymers and natural rubber (NR) filled with 50 parts of HAF carbon black per 100 parts of elastomer but not vulcanized, force-elongation measurements were carried out at 25° C., forming the "green strength" measurement. The force-elongation measurements were carried out on "dumb-bell" test pieces of 2.5 mm. in thickness using an "Instron" electric dynamometer 24 hours after molding and with a rate of traction of 10 cm/minute. The results obtained are shown in the graph of the drawing, the ordinate of which represents the force exerted in g/m$^2$ while the abscissa represents the elongation (in %). It is noted that the copolymers obtained have a resistance to elongation similar to that of natural rubber (NR).

EXAMPLE 3

A Solution A was used formed of the mixture preformed at 80° C. for 1 hour of 1 equivalent of barium nonylphenate and 4 equivalents of triethyl aluminum.

Into a reactor under the pressure of rectified nitrogen there was continuously introduced a mixture of toluene, butadiene, and styrene in such amounts that the weight ratio of monomers to solvent was equal to 1:4 and the ratio of butadiene to styrene was 4.

Solution A, butyl lithium and $C_2H_5(OCH_2CH_2)_2OLi$ were also introduced continuously in such amounts that the molar ratio of Ba:BuLi was equal to 1:3 and the ratio of Ba:alcoholate was equal to 2:5. The rate of flow was regulated in such a manner that there were 600 × 10$^{-6}$ gram atoms of Ba in the reactor for 100 grams of monomer, and the dwell time was 1 hour. The copolymerization was carried out at 80° C.

The percentage of conversion reached was 65%. The copolymer formed was continuously recovered at the outlet of the reactor. It contained 11% by weight of styrene and had an inherent viscosity of 1.9. The content of 1,2 linkages was 4% and the content of trans-1,4 linkages was 80%.

EXAMPLE 4

A catalytic composition formed of the Solution A defined in the preceding example, butyl lithium and $(C_2H_5)_2NCH_2CH_2OLi$ was used. Into a 250 ml. Steinie bottle under the pressure of rectified nitrogen there were introduced 100 ml. of heptane as solvent and 13.6 g. of butadiene. The catalytic composition was then added and the bottle was placed in a bath maintained thermostatically at 80° C. in which it is agitated.

At the end of the reaction, when the conversion rate reached 80%, the polybutadiene was recovered in accordance with a customary method. The results are set forth in Table III below.

TABLE III

| Catalytic Composition | | | | Reaction time | Polybutadiene | | |
|---|---|---|---|---|---|---|---|
| Solution A | | | | | Inherent viscosity | Trans-1,4 content (%) | 1,2- content (%) |
| $Ba(OR)_2$ | Al Et$_3$ | BuLi | $(C_2H_5)_2N\,CH_2CH_2OLi$ | | | | |
| 100 | 400 | 300 | 200 | 45 min. | 1.0 | 90 | 3 |

EXAMPLE 5

A catalytic composition was used formed of the Solution A defined in Example 1, butyl lithium and $C_2H_5(OCH_2CH_2)_2ONa$ and a test was carried out by repeating the method of operation of Example 4. The results obtained are set forth in Table IV below.

TABLE IV

| Catalytic Composition | | | | Reaction time | Polybutadiene | | |
|---|---|---|---|---|---|---|---|
| Solution A | | | | | Inherent viscosity | Trans-1,4 content (%) | 1,2- content (%) |
| $Ba(OR)_2$ | Al Et$_3$ | BuLi | $C_2H_5(OCH_2CH_2)_2ONa$ | | | | |
| 200 | 800 | 600 | 200 | 2 hrs. | 0.9 | 82 | 4 |

EXAMPLE 6

A catalytic system was used consisting of the Solution A defined in Example 3, BuLi and $C_2H_5(OCH_2CH_2)_3OLi$ and a test was carried out by repeating the method of operation set forth in Example 5. The results obtained are set forth in Table V below.

TABLE V

| Catalytic Composition | | | | Reaction time | Polybutadiene | | |
|---|---|---|---|---|---|---|---|
| Solution A | | | | | Inherent viscosity | Trans 1,4 content (%) | 1,2- content (%) |
| $Ba(OR)_2$ | Al Et$_3$ | BuLi | $C_2H_5(OCH_2CH_2)_3OLi$ | | | | |
| 60 | 240 | 180 | 120 | 1 hr. 30 min. | 2.03 | 85 | 3 |

What is claimed is:

1. A process of homopolymerizing conjugated dienes or copolymerizing conjugated dienes with other conjugated dienes or with vinyl aromatic compounds to form elastomeric products which consists essentially of reacting the monomers in the presence of a catalytic composition consisting essentially of (a) an organo-lithium initiator and (b) a tercatalyst system comprising ($b_1$) a compound of barium or strontium or calcium, ($b_2$) an organometallic compound of aluminum or zinc and ($b_3$) an alkali metal alcoholate ether or amine.

2. The process according to claim 1 wherein the compound of barium or strontium or calcium is mixed with the organometallic compound of aluminum or zinc at a temperature between about 20° C. and about 100° C. for about 1 hour to form a preformed mixture.

3. The process according to claim 1 wherein the components of the catalytic composition are present in such quantities that the ratios are within the following limits:

$$1 \leq \frac{\text{mole of an organometallic compound of aluminum or zinc}}{\text{mole of a compound of Ba or Sr or Ca}} \leq 5$$

$$0.25 \leq \frac{\text{mole of a compound of Ba or Sr or Ca}}{\text{gram atom of lithium}} \leq 1$$

$$1 \leq \frac{\text{mole of alkali metal alcoholate ether or amine}}{\text{mole of a compound of Ba or Sr or Ca}} \leq 4.$$

4. The process according to claim 1 wherein the alkali metal alcoholate ether or amine has one of the following two formulas:

$$R(OCH_2CH_2)_nOM^{14} \text{ or } (R)_2NCH_2CH_2OM^{14}$$

in which $M^{14}$ represents an alkali metal; R is an alkyl radical; and n is a whole number.

5. The process according to claim 1 wherein butadiene is used as the conjugated diene, styrene is used as the vinyl aromatic compound and the catalytic composition comprises n-butyl lithium, a barium phenate, a trialkyl aluminum, and a lithium alcoholate ether or amine.

6. The process according to claim 5 wherein the lithium alcoholate ether is $C_2H_5(OCH_2CH_2)_2OLi$.

7. The process according to claim 5 wherein the lithium alcoholate amine is $(C_2H_5)_2NCH_2CH_2OLi$.

8. The homopolymers or copolymers obtained by the process according to claim 1.

UNITED STATES PATENT OFFICE
CERTIFICATE OF CORRECTION

Patent No. 4,129,705  Dated December 12, 1978

Inventor(s) Yves deZarauz

It is certified that error appears in the above-identified patent and that said Letters Patent are hereby corrected as shown below:

First page, Item 30, "Feb. 2, 1975" should read -- Feb. 2, 1976 --. Col. 4, line 37, "g/m$^2$" should read -- g/mm$^2$ --. Col. 5, line 66, "consists essentially of" should read -- comprises --; last line, "comprising" should read -- consisting essentially of --.

Signed and Sealed this

Fourth Day of September 1979

[SEAL]

Attest:

Attesting Officer

LUTRELLE F. PARKER

Acting Commissioner of Patents and Trademarks

UNITED STATES PATENT AND TRADEMARK OFFICE
CERTIFICATE OF CORRECTION

PATENT NO. : 4,129,705
DATED : December 12, 1978
INVENTOR(S) : Yves deZarauz

It is certified that error appears in the above—identified patent and that said Letters Patent are hereby corrected as shown below:

First page, Item [30], "France ..... 75 04115" should read -- France ..... 76 04115 --. First page, Item [30], "Feb. 2, 1975" should read -- Feb. 12, 1976 --.

Signed and Sealed this

Sixth Day of May 1980

[SEAL]

Attest:

SIDNEY A. DIAMOND

Attesting Officer    Commissioner of Patents and Trademarks